United States Patent [19]

Seko et al.

[11] Patent Number: 4,757,410
[45] Date of Patent: Jul. 12, 1988

[54] MAGNETORESISTANCE EFFECT FOR SHORT AND LONG WAVELENGTH RECORDINGS

[75] Inventors: Satoru Seko; Yutaka Soda; Hiroyuki Uchida; Tetsuo Sekiya, all of Kanagawa, Japan

[73] Assignee: Sony Corporation, Tokyo, Japan

[21] Appl. No.: 793,089

[22] Filed: Oct. 30, 1985

[30] Foreign Application Priority Data

Oct. 31, 1984 [JP] Japan .................. 59-229716

[51] Int. Cl.$^4$ ............................................. G11B 5/127
[52] U.S. Cl. ..................................... 360/113; 360/126
[58] Field of Search ............... 360/113, 110, 126, 127; 338/32 R; 324/252

[56] References Cited

U.S. PATENT DOCUMENTS 3,969,769  7/1976  Gorter et al. ................. 360/113
4,488,194 12/1984  Michel ........................ 360/113

FOREIGN PATENT DOCUMENTS 0023921 2/1977 Japan .................. 360/113
0172108 9/1984 Japan .................. 360/113

Primary Examiner—Robert S. Tupper
Assistant Examiner—Andrew L. Sniezek
Attorney, Agent, or Firm—Hill, Van Santen, Steadman & Simpson

[57] ABSTRACT

A multi-channel magnetoresistance effect type magnetic head has a short wavelength region magnetic head element and a relatively longer wavelength region magnetic head element. The two head elements are provided on a magnetic substrate with each having a magnetic circuit containing a magnetic gap facing a surface adjacent to and across from a magnetic recording medium. Each magnetic circuit has a discontinuity portion with a bridging magnetoresistance effect sensing element to magnetically connect the discontinuity portion. The longer wavelength magnetic head discontinuity portion is spaced at a greater distance from the adjacent surface than is the discontinuity portion of the shorter wavelength magnetic head element.

3 Claims, 6 Drawing Sheets

MAGNETORESISTANCE EFFECT FOR SHORT AND LONG WAVELENGTH RECORDINGS

BACKGROUND OF THE INVENTION

The present invention relates to a multi-channel magnetoresistance effect (MR) type magnetic head for a digital audio tape recorder (hereinafter referred to as "DAT"), for example.

In a multi-channel MR type magnetic head for a DAT, a magnetic head element corresponding to a number of data tracks, a magnetic head element corresponding to tracks where graphic character information or the like is recorded and reproduced individually (hereinafter referred to as "AUX tracks"), and a magnetic head element corresponding to tracks for enabling high-speed random access, i.e. cue tracks which permit a speed variation and reading in forward and reverse directions and contain time record information, music number information or the like (hereinafter referred to as "CUE tracks"), are arranged Among these tracks, in the data track and the AUX track, the recording is performed at a short wavelength region (hereinafter referred to as "first wavelength region") to increase the recording density. In the CUE track, however, the recording is performed at a long wavelength region (hereinafter referred to as "second wavelength region") with a considerably longer wavelength than that of the first wavelength region so as to read the signal in a secure fashion, even if the spacing is increased during the high-speed search.

In such a prior art magnetic head, each magnetic head element corresponding to the various tracks is manufactured in the same process to simplify the manufacturing and designing of the magnetic head element, which is selected to provide the best characteristics in the magnetic head element of the data track necessitating the particular sensitivity. First, a multi-channel MR type magnetic head of the prior art will be described FIGS. 6 and 7 respectively show a schematic plan view and a sectional view of a multi-channel MR type magnetic head of the prior art. In the magnetic head, a magnetic substrate 1 is made of Ni-Zn ferrite, for example, and a bias conductor 2 of a band-shaped conductive film as a current path for supplying a bias magnetic field to MR sensing element corresponding to each channel, i.e. each track is formed on the magnetic substrate 1 linearly along the arranged direction of each channel. MR sensing elements $MR_{aux}$, $MR_{cue}$, and MR made of Ni-Fe alloy or Ni-Co alloy thin film, and corresponding to respective channels, i.e. AUX tracks, CUE tracks, and data tracks, are formed on the bias conductor 2 through an insulation layer 3. A front magnetic core 6 and a back magnetic core 7, each formed of a magnetic layer of Ni-Fe alloy for example, are also formed on the MR sensing elements with an insulation layer 5 in the direction crossing the MR sensing elements $MR_{aux}$, MR, $MR_{cue}$ corresponding to respective channels. These cores 6 and 7 are spaced on the sensing elements $MR_{aux}$, MR, $MR_{cue}$ at a discontinuity portion G for a required distance. An outside edge of the front magnetic core 6 is adjacent to and faces the magnetic substrate 1 through a non-magnetic insulation layer. The gap spacer 4, and a magnetic gap (g) with a gap length defined by the gap spacer 4, is formed between the core 6 and the magnetic substrate 1. The gap spacer 4 may be formed by the insulation layer 5 and/or the insulation layer 3, or otherwise it may be formed by etching the layers 5, 3 in a partial thickness or by newly forming other non-magnetic layers. Its width is selected to provide a gap depth (d) for the magnetic gap (g). An outside edge of the back magnetic core 7 is connected through a window 8, for example, bored on the insulation layers 3 and 5, to the magnetic substrate 1 in close magnetic coupling. A non-magnetic insulation protective layer 9 is formed to cover the bias conductor 2, the MR sensing elements $MR_{aux}$, MR, $MR_{cue}$, and the magnetic cores 6 and 7, and a protective substrate 11 is adhered onto the non-magnetic insulation protective layer 9 by an adhesive agent layer 10. An outside edge of the substrates 1 and 11 and the front magnetic core 6 between these substrates is commonly cut and polished a surface 12 opposite to the magnetic medium is thus formed Accordingly, the magnetic gap (g) faces on the opposite surface 12, and magnetic head element units $h_{aux}$, $h_{cue}$ corresponding to the AUX and CUE tracks and data track magnetic head element unit h, each have a closed magnetic path formed by the magnetic substrate 1 - the magnetic gap (9) - the front magnetic core 6 -the MR sensing elements $MR_{aux}$, MR, $MR_{cue}$ - the back magnetic core 7 - and the magnetic substrate 1.

In such a construction, through conduction in the bias conductor 2, the bias magnetic field is supplied to the MR sensing elements $MR_{aux}$, $MR_{cue}$, MR, thereby detecting current flows in each of the MR sensing elements $MR_{aux}$, $MR_{cue}$, MR. A resistance variation based on the magnetic field variation in each of the closed magnetic paths leading to the MR sensing elements $MR_{aux}$, $MR_{cue}$, MR by the recorded electric field on the magnetic medium is detected as a voltage variation, for example, and reproduced.

In the multi-channel MR type magnetic head as above described, a track width $W_{cue}$ of the magnetic head element unit $h_{cue}$ for the CUE tracks is selected larger than a track width W in the other magnetic head element unit, and each of the MR sensing elements $MR_{aux}$, $MR_{cue}$, and MR, and hence each discontinuity portion G, is arranged linearly along the arranging direction of each of the magnetic head element units $h_{aux}$, $h_{cue}$, and h, i.e. at an equal distance L from the opposite surface 12 to the magnetic medium. A width of the gap spacer 4 to define the gap depth is selected equal in each of the magnetic head element units $h_{aux}$, $h_{cue}$ and h, and the gap depth of each magnetic gap (g) of the element units $h_{aux}$, $h_{cue}$ and h is selected to a constant depth (d).

A forward travelling direction of the magnetic medium relative to the magnetic head is selected in the direction along the width direction of the magnetic head as shown by arrow (a) in FIG. 7, e.g. in the direction from the protective substrate 11 towards the magnetic substrate 1.

In such a multi-channel MR type magnetic head, the magnetic head element unit $h_{cue}$ to the CUE tracks has the same construction and hence the same characteristics as that of the other magnetic head element unit h for data tracks. In this case, in order to perform the best reproduction in the data track as described at the beginning, in a construction thereof, i.e. at the gap depth (d) of the magnetic head (g), a distance between the opposite surface to the magnetic medium and the MR sensing element (i.e. substantial length L of the front magnetic core), the gap length, and the core thickness or the like, may be selected.

In the multi-channel MR type magnetic head as above described, problems may result at long wavelength regions, i.e. the second wavelength region, and more specifically at the magnetic head element unit $h_{cue}$ for the CUE tracks. In the MR type magnetic head of a so-called yoke form where the front magnetic core 6 and the back magnetic core 7 are installed, and the MR sensing element is arranged at the discontinuity portion G between both cores, since the substantial length L and the thickness of the front magnetic core 6 are finite, a magnetic flux at a long wavelength from the magnetic medium cannot be entirely taken into the magnetic path leading to the MR sensing element. In other words, the deterioration of long wavelength reproduction output characteristics and the phase rotation in the long wavelength region are an inherent property based on a structure of the magnetic head. Particularly in each MR type magnetic head element as above described, since the substantial length of the front magnetic core 6 in each magnetic head element, i.e. distance L between the opposite surface 12 to the magnetic medium and the MR sensing elements $MR_{aux}$, $MR_{cue}$, MR, is selected as a small value so as to obtain good output characteristics in the long wavelength region, a deterioration of the reproduction output characteristics and the phase rotation in he output waveform, and a so-called dullness of the waveform. This disturbs the signal reading on the CUE track. Consequently, problems may be produced particularly when reading during a reverse feeding of the magnetic medium.

When all magnetic head elements for data tracks and CUE tracks are made with the same characteristics, since the transmission characteristics in the magnetic head naturally show the higher transfer function at the long waveform region, problems may be produced by a non-linear action in the MR sensing element caused by excessive input to the CUE track at the long wavelength reproduction. Furthermore, since a distance L between the opposite surface to the magnetic medium and the MR sensing element is selected as a small value as above described, rubbing noise problems may be produced during the high-speed search. The rubbing noise is caused by a heating of the MR sensing element by the flowing detecting current. This heat is radiated in unstable fashion by the unstable contacting during the high-speed travelling of the magnetic medium of the magnetic head. For example, if the reproduction output from the CUE track has a noiseless waveform as shown in FIG. 8A and the detecting data train has a rectangular waveform as shown in FIG. 8B, the detecting waveform producing the rubbing noise shows a variation of a d.c. level of the low region noise caused by the rubbing noise as shown in FIG. 9A. Thus, the waveform variation causes a jitter of the detecting data as shown in FIG. 9B.

SUMMARY OF THE INVETNION

It is an object of the invention to provide a multi-channel MR type magnetic head where the above problems in the multi-channel MR type magnetic head of a so-called yoke form can be solved without producing an increase of the manufacturing process cost.

In the present invention, a reproduction magnetic head element of a first wavelength region for example, each magnetic head element for data tracks and AUX tracks, and another reproduction magnetic head of a second wavelength region with a longer wavelength than that of the first wavelength region, for example a magnetic head element for CUE tracks, are arranged on a common magnetic substrate. Each of the reproduction magnetic head elements is provided with a magnetic circuit having a magnetic gap facing towards an adjacent surface of a magnetic medium. The magnetic circuit is also provided with a discontinuity portion. The discontinuity portion has a magnetoresistance effect sensing element so as to connect the discontinuity portion magnetically. The magnetoresistance effect sensing element of the reproduction magnetic head element of the second longer wavelength region is positioned further towards a rear side with respect to the opposite surface of the magnetic recording medium in comparison to the magnetoresistance effect sensing element of the reproduction magnetic head element of the first wavelength region. That is, a substantial length of the front magnetic core forming the magnetic circuit of the magnetic head element for the second longer wavelength region is made larger than a length of the front magnetic case forming the first shorter wavelength region.

According to the invention as above described, the MR sensing element in the magnetic head element for the second wavelength region, i.e. long wavelength region, for example the magnetic head element for the CUE tracks, is positioned closer towards a rear side with respect to the opposite surface of the magnetic medium in comparison to other tracks. Thus, the magnetic head element for the CUE tracks has excellent long wavelength characteristics in comparison to the other magnetic head element, for example a magnetic head element for data tracks. Furthermore, since the MR sensing element of the magnetic head element for the long wavelength region is positioned closer towards the rear side, the front magnetic core length becomes substantially longer and therefore the sensitivity is reduced, so that the non-linear action of the MR sensing element caused by the excessive input during the long wavelength reproduction as above described can be avoided.

Furthermore, since the MR sensing element in the magnetic head element for the long wavelength region, for example the magnetic head element for CUE tracks, is positioned closer towards a rear side with respect to the opposite surface of the magnetic medium, the rubbing noise can be reduced even at a high travelling speed of the magnetic medium. Since the distance between the opposite surface to the magnetic medium and the MR sensing element is made large, the heat capacity between both members is made large and therefore an influencing of the opposing state of the MR sensing element to the magnetic medium, i.e. the heat radiation state, becomes small so that the temperature variation at the MR sensing element can be reduced.

DESCRIPTION OF THE PREFERRED EMBODIMENTS

Figure 1:
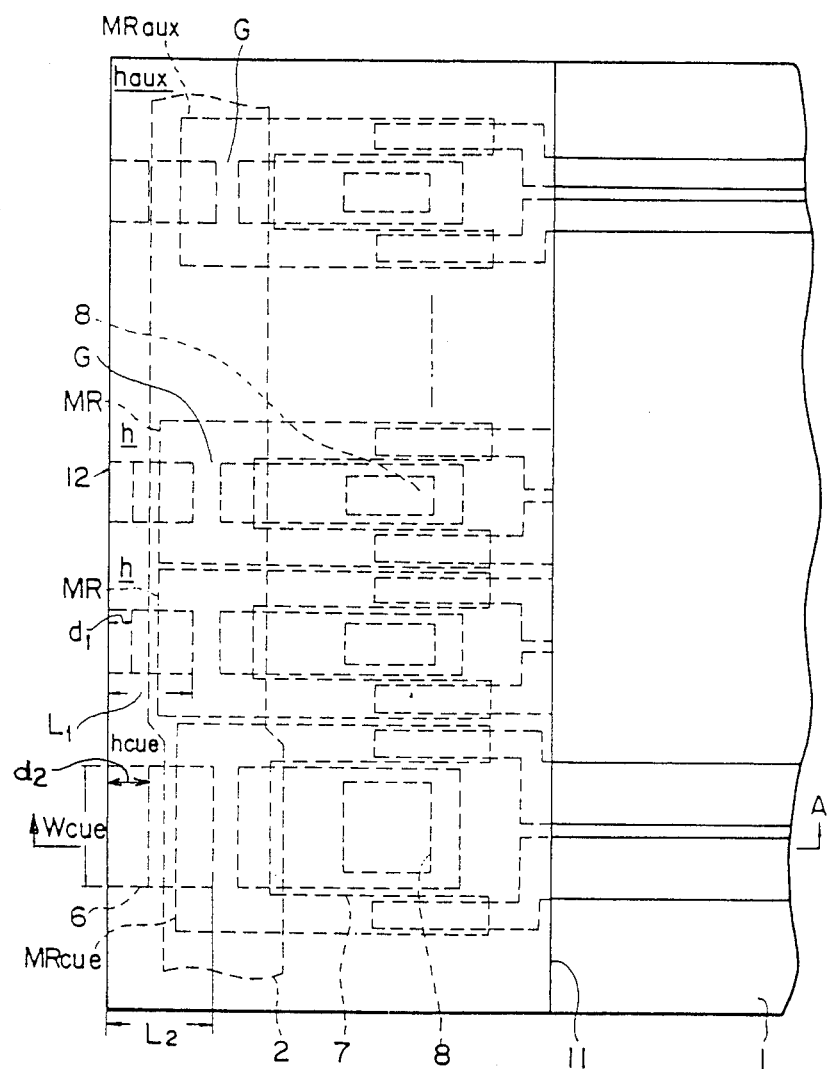
FIG. 1 is a schematic plan view of a multi-channel MR type magnetic head element in a preferred embodiment of the invention.
Figure 2:
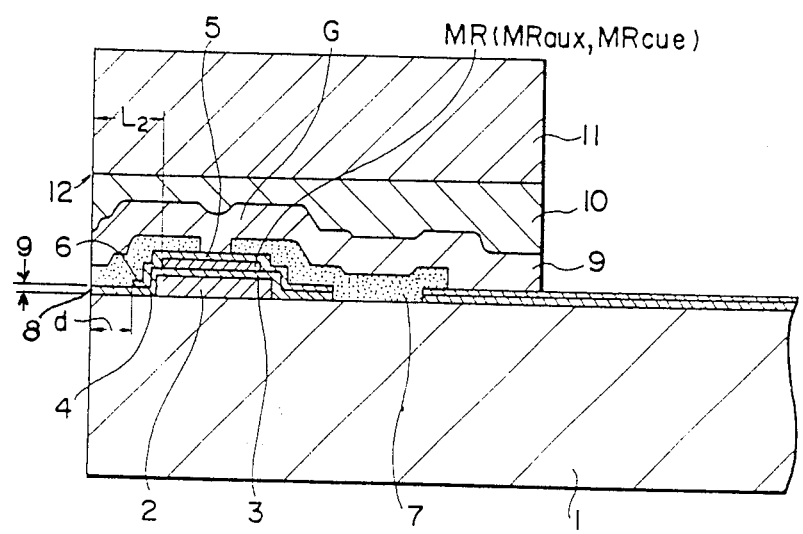
FIG. 2 is a sectional view taken along line A—A of FIG. 1.
Figure 6:
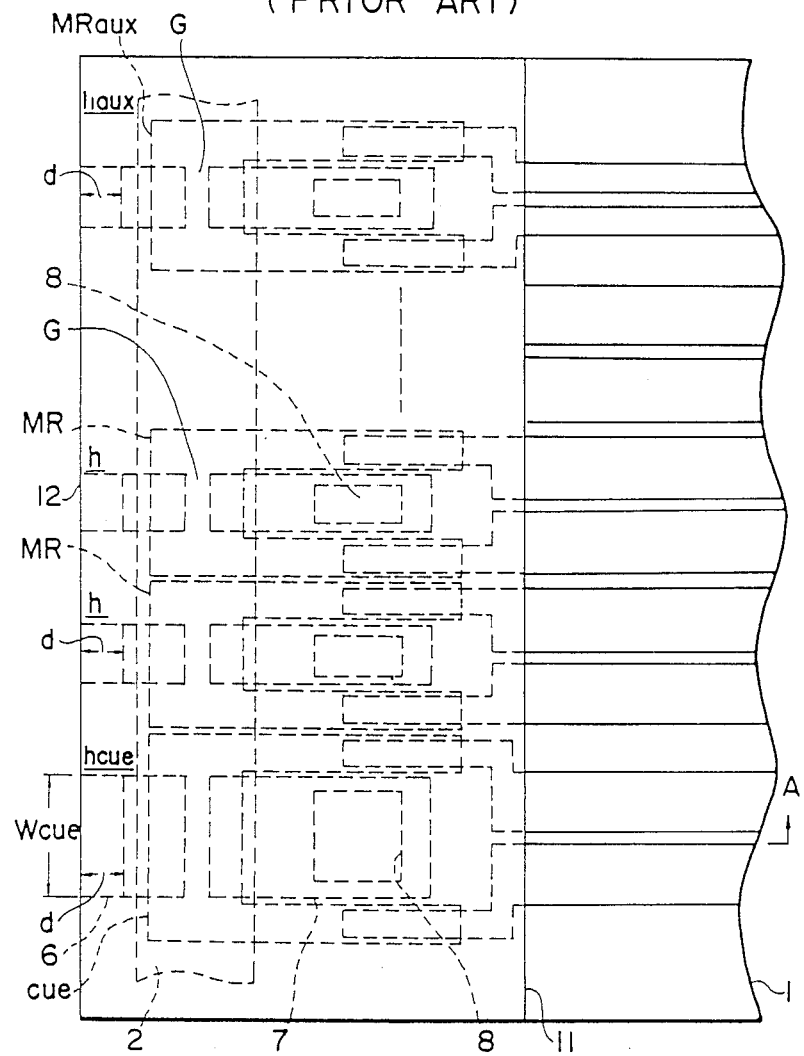
FIGS. 6 and 7 are a schematic plan view and a sectional view of a multi-channel MR type magnetic head of the prior art.
Figure 7:
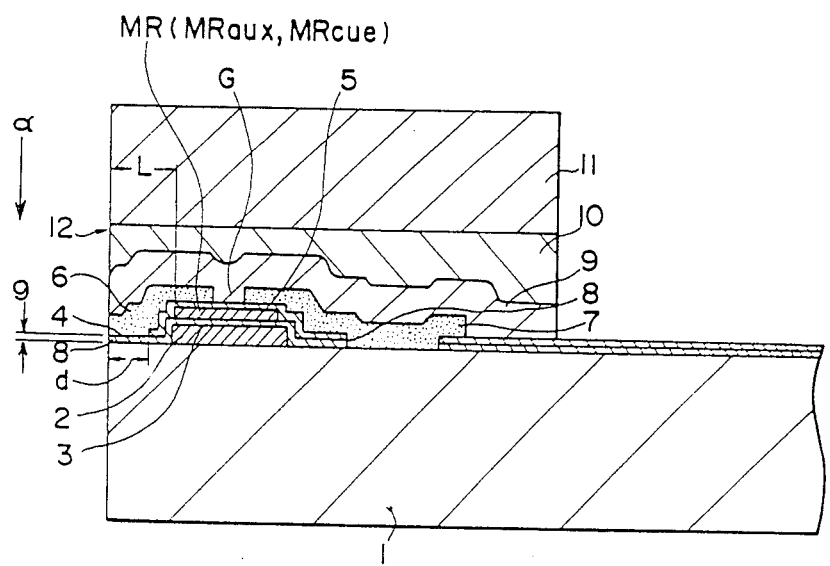
Figure 8:
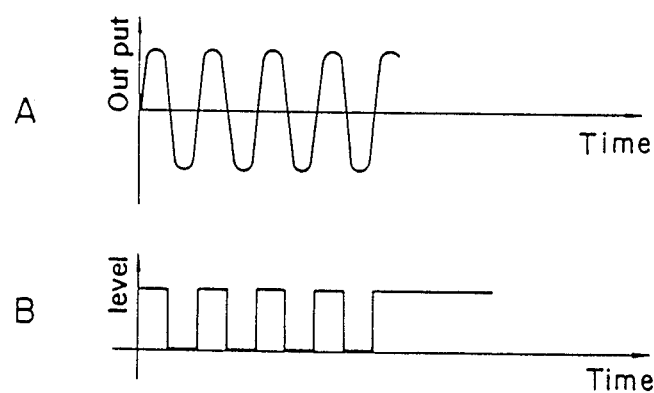
FIGS. 8 and 9 are waveform charts illustrating the prior art.
Figure 9:
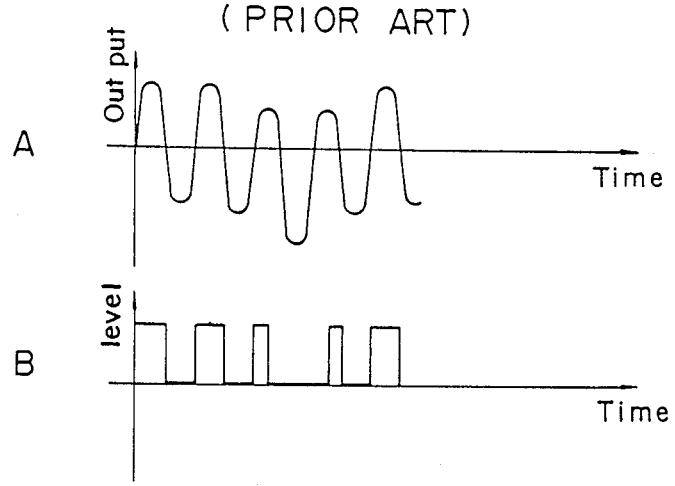

A preferred embodiment of the invention will now be described referring to FIG. 1 and FIG. 2. Parts in FIG. 1 and FIG. 2 corresponding to that in FIG. 6 and FIG. 7 are designated by the same reference numerals and thus an overlapping description has been omitted.

In the present invention, a position of a discontinuity portion G between a front magnetic core 6 of a magnetic head element unit $h_{cue}$ for the CUE track in the embodiment and a back magnetic core 7, i.e. a position of the MR sensing element $MR_{cue}$ arranged here, is further towards a rear side with respect to a surface 12 adjacent to the magnetic medium, in comparison to a position of a discontinuity portion G in other reproduction magnetic head elements used for short wavelength, such as a magnetic head element unit h for a data track and a magnetic head element unit $h_{aux}$ for an AUX track in the embodiment In other words, if a distance between the MR sensing elements $MR_{aux}$ and MR of the magnetic head element units h h and the adjacent surface 12 is assumed to be L1, and a distance between the MR sensing element $MR_{cue}$ of the magnetic head element unit $h_{cue}$ and the adjacent surface 12 is assumed to be $L_2$, $L_1$ and $L_2$ are selected so that $L_1 L_2$.

More specifically, for example, the bias conductor 2 as a current path for supplying the bias magnetic field to the MR element of each channel on the magnetic substrate 1 is arranged on a line spaced by an equal distance from the opposite surface with respect to the magnetic head element units $h_{aux}$ and h, whereas it is formed as a bent pattern located further away from the surface 12 adjacent to the medium with respect to the magnetic head element unit $h_{cue}$ for the CUE track. As a result, a width of the gap spacer 4 and hence the gap depth is made a larger width $d_2$ in the magnetic head element unit $h_{cue}$ of the second wavelength region, and is made a small width $d_1$ in the magnetic head element units h, $h_{aux}$ for data of the first wavelength region.

Figure 3:
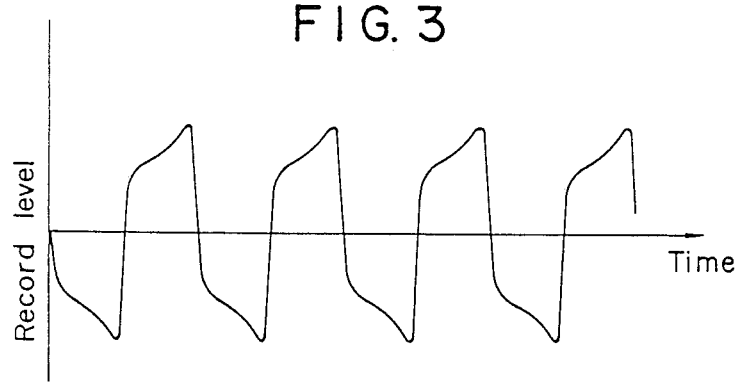
FIGS. 3 through 5 are waveform charts illustrating the preferred embodiment.
Figure 4:
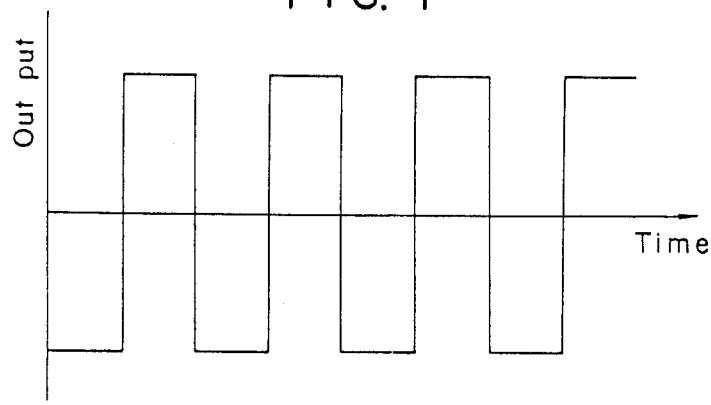
Figure 5:
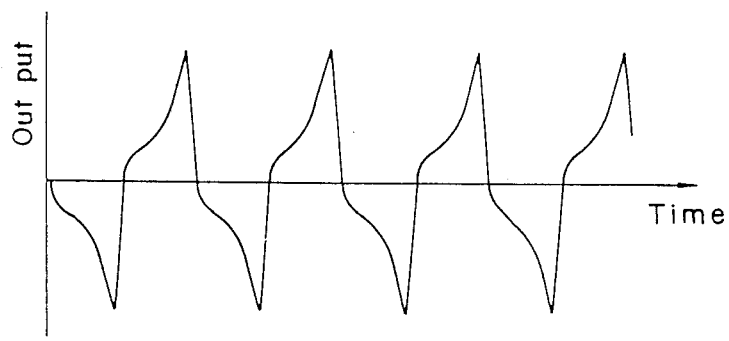

Although the magnetic substrate 1 is made of insulation material such as Ni-Zn ferrite in the embodiment as above described, if it is made of a conductive material such as Mn-Zn ferrite, the bias conductor 2 is formed thereon together with an insulation layer In the above construction, if distance $L_1$ and distance $L_2$ from surface 12 to the MR sensing elements in the magnetic head element units h and $h_{cue}$ is to be assumed $L_1=3\mu m$ and $L_2=20\mu m$, respectively, and the travelling speed of the magnetic medium is assumed to be 4.8 cm/sec reproduction output waveforms from the magnetic head element units h and $h_{cue}$ with respect to the rectangular wave record signal of wavelength $25\mu m$ shown in FIG. 3 become as shown in FIGS. 4 and 5 respectively. It is clear from the figures that in the element unit $h_{cue}$ with the MR sensing element disposed further towards the rear side, output characteristics with relatively little waveform distortion for long wavelengths can be obtained.

According to the invention as above described, the distance $L_2$ between the MR sensing element in the MR magnetic head element unit for the second wavelength region, i.e. the long wavelength region, and the surface adjacent to the magnetic medium is made larger. Since patterns of the conductor 2, and the magnetic cores 6 and 7 are only partly changed in this construction, the number of manufacturing processes is not increased.

According to the invention as above described, since the MR sensing element in the magnetic head element with respect to the second wavelength region, i.e. the long wavelength region, is positioned at the rear side with respect to the opposite surface to the magnetic medium in comparison to other, sensing element excellent characteristics can be obtained in the long wavelength region with relatively little waveform distortion. Consequently, a signal on the CUE track can be securely read even for reverse travel of the magnetic medium, and even given a variation of the travelling speed.

Furthermore, since the MR sensing element of the magnetic head element for the long wavelength region is positioned more rearwardly, the front magnetic core length becomes substantially longer. Consequently, at the front side of the MR sensing element $MR_{cue}$, the amount of magnetic flux dissipated leading to a portion between the front magnetic core 6 and the magnetic substrate 1 without passing through the $MR_{cue}$ is increased and therefore the sensitivity in the element unit $h_{cue}$ is reduced. Thus, the non-linear action of the MR sensing element caused by the excessive input during the long wavelength reproduction as above described can be avoided.

Furthermore, since the MR sensing element in the magnetic head element for the long wavelength region, for example, the magnetic head element for the CUE tracks, is positioned more rearwardly with respect to the surface adjacent to the magnetic medium, the rubbing noise can be reduced even at a high travelling speed of the magnetic medium. That is, since the distance between the opposite surface to the magnetic medium and the MR sensing element is larger, the heat capacite between both members is larger and therefore the influence of the opposing state of the MR sensing element to the magnetic medium, i.e. the heat radiation state, becomes small so that the temperature variation at the MR sensing element can be reduced.

Although various minor changes and modifications might be proposed by those skilled in the art, it will be understood that we wish to include within the claims of the patent warranted hereon all such changes and modifications as reasonably come within our contribution to the art.

We claim as our invention:

1. A multi-channel magnetoresistance effect type magnetic head assembly for use with a magnetic recording medium having first and second recording tracks, the first track being recorded in a region of a first wavelength and the second track being recorded in a region of a second wavelength, comprising:

a first reproduction magnetic head element operable in a region of said first wavelength and positioned for engagement at the first recording track of the magnetic recording medium so as to produce a first information signal;

a second reproduction magnetic head element operable in a region of said second wavelength wherein the second wavelength is longer than the first wavelength and positioned for engagement at the second recording track of the magnetic recording medium so as to produce a second information signal different than the first signal said first signal and said second signal being adapted to be used independently;

the first and second head elements being arranged on a magnetic substrate;

each of the head element having a magnetic circuit with a magnetic gap at a surface adjacent to and facing a location where the magnetic recording medium is positioned;

each of said magnetic circuits being provided with a discontinuity portion having a magnetoresistance effect sensing element thereat so as to connect the discontinuity portion magnetically; and the magnetoresistance effect sensing element of the second magnetic head element of the second wavelength being positioned rearwardly with respect to the magnetoresistance effect sensing element of the first magnetic head element of the first wavelength region relative to the adjacent surface.

2. A multi-channel magnetoresistance effect type magnetic head assembly for use with a magnetic recording medium having first and second recording tracks, the first track being recorded in a region of a first wavelength and the second track being recorded in a region of a second wavelength, comprising:

a first reproduction magnetic head element operable in said first wavelength region and positioned for engagement at the first recording track of the magnetic recording medium so as to produce a first information signal;

a second reproduction magnetic head element operable in said second wavelength region which is of a relatively longer wavelength as compared to the wavelength of the first region and positioned for engagement at the second recording track of the magnetic recording medium so as to produce a second information signal different than the first signal;

the first and second head elements being arranged on a magnetic substrate;

each of the head elements having a magnetic circuit with a magnetic gap at a surface adjacent to and across from a location where the magnetic recording medium is positioned;

each of the magnetic circuits being provided with a discontinuity portion comprising respective end faces of a front core and back core so as to form a gap therebetween, and wherein a magnetoresistance effect sensing element is positioned beneath the front and back core end faces and beneath the gap so as to magnetically connect the discontinuity portion gap; and the second head element discontinuity portion gap being spaced at a greater distance from said adjacent surface than the discontinuity portion gap of the first head element.

3. An assembly according to claim 2 wherein a strip-shaped bias conductor runs underneath the magnetoresistance effect sensing elements of the first and second head elements and is common to both, and wherein a second portion of the bias conductor underlying the second head element sensing element is offset relative to a first portion of the bias conductor of the first head element sensing element, said offset of the second head element providing the second portion of the bias conductor at a greater distance form said adjacent surface than the first portion of the bias conductor.

* * * * *